United States Patent
Wang et al.

(10) Patent No.: US 11,353,476 B2
(45) Date of Patent: Jun. 7, 2022

(54) METHOD AND APPARATUS FOR DETERMINING VELOCITY OF OBSTACLE, DEVICE AND MEDIUM

(71) Applicant: Apollo Intelligent Driving Technology (Beijing) Co., Ltd., Beijing (CN)

(72) Inventors: Hao Wang, Beijing (CN); Liang Wang, Beijing (CN); Yu Ma, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 17/030,838

(22) Filed: Sep. 24, 2020

(65) Prior Publication Data
US 2021/0293844 A1    Sep. 23, 2021

(30) Foreign Application Priority Data

Mar. 17, 2020    (CN) .......................... 202010188560.X

(51) Int. Cl.
*G01P 3/64*    (2006.01)
*G01S 13/89*    (2006.01)
*G01S 13/931*    (2020.01)

(52) U.S. Cl.
CPC ................ *G01P 3/64* (2013.01); *G01S 13/89* (2013.01); *G01S 13/931* (2013.01)

(58) Field of Classification Search
CPC ........... G01P 3/64; G01S 13/89; G01S 13/931
See application file for complete search history.

(56) References Cited

U.S. PATENT DOCUMENTS

| | | | |
|---|---|---|---|
| 9,043,069 B1 | 5/2015 | Ferguson | |
| 10,809,073 B2* | 10/2020 | He | G06K 9/00798 |
| 2014/0334685 A1* | 11/2014 | Chen | G06T 7/246 |
| | | | 382/107 |
| 2018/0341263 A1* | 11/2018 | Rust | G01S 13/74 |
| 2019/0163958 A1 | 5/2019 | Li | |
| 2019/0340781 A1* | 11/2019 | Guo | G01S 13/89 |
| 2020/0041619 A1 | 2/2020 | Maheshwari | |

FOREIGN PATENT DOCUMENTS

| | | |
|---|---|---|
| CN | 106997049 | 8/2017 |
| EP | 3525000 | 8/2019 |

* cited by examiner

*Primary Examiner* — Natalie Huls
*Assistant Examiner* — Cynthia L. Davis
(74) *Attorney, Agent, or Firm* — Knobbe, Martens, Olson & Bear LLP

(57) ABSTRACT

Embodiments of the present disclosure provide a method and apparatus for determining a velocity of an obstacle, a device, and a medium. An implementation includes: acquiring a first point cloud data of the obstacle at a first time and a second point cloud data of the obstacle at a second time; registering the first point cloud data and the second point cloud data by moving the first point cloud data or the second point cloud data; and determining a moving velocity of the obstacle based on a distance between two data points in a registered data point pair.

16 Claims, 4 Drawing Sheets

METHOD AND APPARATUS FOR DETERMINING VELOCITY OF OBSTACLE, DEVICE AND MEDIUM

CROSS-REFERENCE TO RELATED APPLICATIONS

This application claims priority to Chinese Patent Application No. 202010188560.X, filed with the China National Intellectual Property Administration (CNIPA) on Mar. 17, 2020, the contents of which are incorporated herein by reference in their entirety.

TECHNICAL FIELD

Embodiments of the present disclosure relate to the field of data processing technology, particularly to autonomous driving technology. More particularly, embodiments of the present disclosure relate to a method and apparatus for determining a velocity of an obstacle, a device and a medium.

BACKGROUND

Obstacle prediction is a very important module in an unmanned vehicle system. Stable and accurate velocity is essential to predict the next behavior of an obstacle.

SUMMARY

Embodiments of the present disclosure provide a method and apparatus for determining a velocity of an obstacle, device and medium, to improve the accuracy of the determined velocity of the obstacle.

Some embodiments of the present disclosure provide a method for determining a velocity of an obstacle, the method includes:

acquiring a first point cloud data of the obstacle at a first time and a second point cloud data of the obstacle at a second time;

registering the first point cloud data and the second point cloud data by moving the first point cloud data or the second point cloud data; and determining a moving velocity of the obstacle based on a distance between two data points in a registered data point pair.

In embodiments of the present disclosure, by adding a process of registering the first point cloud data and the second point cloud data by moving the first point cloud data or the second point cloud data, so that even if the point cloud data is incomplete, it is still possible to find a pair of accurately registered data points, thereby effectively solving the blocking problem and improving the accuracy of the velocity of the obstacle.

Alternatively, the registering the first point cloud data and the second point cloud data, includes:

determining first point cloud distribution information of the first point cloud data and second point cloud distribution information of the second point cloud data; and registering the first point cloud data and the second point cloud data, based on the first point cloud distribution information and the second point cloud distribution information.

Based on this technical feature, embodiments of the present disclosure registers the first point first point cloud data and the second point cloud data based on the first point cloud distribution information and the second point cloud distribution information, compared to registering directly based on the data points, since the embodiment of the present disclosure does not need to perform registration calculation on each of the data points, the amount of calculation may be reduced, thereby further improving the registration efficiency.

Alternatively, the determining first point cloud distribution information of the first point cloud data, includes:

determining a first projection plane of the first point cloud data;

projecting the first point cloud data into grids of a set size in the first projection plane, to obtain first grid projection data; and determining the first point cloud distribution information based on the first grid projection data.

Based on this technical feature, by projecting the first point cloud data into grids of a set size in the first projection plane, and determining the first point cloud distribution information based on the projection data of the grids, thereby facilitating the determination of the point cloud distribution information, and improving the accuracy of describing the first point cloud data by the first point cloud distribution information.

Alternatively, the determining a first projection plane of the first point cloud data, includes:

determining at least one projection direction according to at least one direction of the moving velocity;

combining a direction perpendicular to a ground with the at least one projection direction, respectively; and constructing at least one first projection plane based on a direction pair obtained by the combining.

Based on this technical feature, embodiments of the present disclosure determine at least one projection direction according to at least one direction of the moving velocity; combine a direction perpendicular to a ground with the at least one projection direction, respectively; and construct at least one first projection plane based on a direction pair obtained by the combining, so that realizing determining at least one first projection plane based on at least one direction of the moving velocity, thereby the determination of the moving velocity at different directions is realized.

Alternatively, the projecting the first point cloud data into the grids of the set size in the first projection plane to obtain the first grid projection data, includes:

converting the first point cloud data into a three-dimensional coordinate system, the three-dimensional coordinate system being with a centroid of the first point cloud data as an origin, and a plane constructed by two coordinate axes of the coordinate system being the first projection plane;

partitioning, with the origin of the coordinate system as a center, the first projection plane into the grids of the set size; and projecting the converted first point cloud data into the partitioned grids to obtain the first grid projection data.

Based on this technical feature, an embodiment of the present disclosure converts the first point cloud data into a three-dimensional coordinate system that is with the centroid of the first point cloud data as the origin; partitions, with the origin of the coordinate system as the center, the first projection plane into the grids of the set size; and projects the converted first point cloud data into the partitioned grids, so that the projection points of the first point cloud data are distributed with the center of the grids as a distribution center, thereby facilitating subsequent registration calculation.

Alternatively, the projecting the first point cloud data into the grids of the set size in the first projection plane to obtain the first grid projection data, includes:

determining a display scale of the first point cloud data in the grids based on a size of the first point cloud data and the size of the grid; and projecting the first point cloud data into the grids to obtain the first grid projection data according to the display scale.

Based on this technical feature, an embodiment of the present disclosure determines a display scale of the first point cloud data in the grids based on a size of the first point cloud data and the size of the grid; and projects the first point cloud data into the grids to obtain the first grid projection data according to the display scale, so that all the data points in the first point cloud data is projected into the grids to obtain complete point cloud distribution information.

Alternatively, the determining the first point cloud distribution information based on the first grid projection data, includes:

in response to a number of data points projected into a grid being greater than 0, determining a distance parameter between the grid and an obstacle boundary as 0;

in response to the number of the data points projected into the grid is less than or equal to 0, searching, in a row direction, for a target grid closest to the grid and having a number of projected data points greater than 0;

determining the distance parameter of the grid based on a number of grids between the grid and the target grid; and using the determined distance parameter as the first point cloud distribution information.

Based on this technical feature, an embodiment of the present disclosure determines the distance parameter between a grid and the obstacle boundary, based on the number of data points projected into the grid, thereby realizing the determination of the first point cloud distribution information.

Alternatively, the point cloud distribution information comprises at least one of: numbers of data points projected into the grids, distance parameters between the grids and the obstacle boundary, numbers of data points projected into columns of grids, or a length of grids in the row direction of the obstacle.

Based on this technical feature, an embodiment of the present disclosure registers the point cloud data based at least one of: numbers of data points projected into the grids, distance parameters between the grids and the obstacle boundary, numbers of data points projected into columns of grids, or a length of grids in the row direction of the obstacle, so that the accuracy in registering the point cloud data is improved.

Alternatively, the registering the first point cloud data and the second point cloud data by moving the first point cloud data or the second point cloud data, incudes:

moving the first point cloud data or the second point cloud data based on an orientation of the obstacle;

calculating a matching degree between the first point cloud data and the second point cloud data after moving, based on the first point cloud distribution information and the second point cloud distribution information; and determining a registration position of the first point cloud data and the second point cloud data based on the calculated matching degree.

Based on this technical feature, an embodiment of the present disclosure moves the first point cloud data or the second point cloud data based on an orientation of the obstacle; calculates a matching degree between the first point cloud data and the second point cloud data after moving based on the first point cloud distribution information and the second point cloud distribution information; and determines a registration position of the first point cloud data and the second point cloud data based on the calculated matching degree, so that the register of the first point cloud data and the second point cloud data is realized.

Alternatively, the determining the registration position of the first point cloud data and the second point cloud data based on the calculated matching degree, includes:

normalizing matching degrees calculated after at least two times of moving, to obtain probabilities that the at least two times of moving belong to real displacements;

calculating a displacement expectation based on the probabilities, and using the calculated displacement expectation as an optimal moving distance; and using a position after moving the optimal moving distance as the registration position.

Based on this technical feature, an embodiment of the present disclosure perform optimal estimation on the moving distance by using the matching degrees calculated after at least two times of moving, so as to improve an accuracy of determining the moving distance, and thus the accuracy of determining the registration position is improved.

Alternatively, the determining a moving velocity of the obstacle based on the distance between two data points in the registered data point pair, includes:

determining a target moving distance of the obstacle between the first time and the second time, based on the distance between the two data points in the registered data point pair; and determining the moving velocity of the obstacle, based on the target moving distance.

Based on this technical feature, an embodiment of the present disclosure determines a target moving distance of the obstacle between the first time and the second time, based on the distance between the two data points in the registered data point pair, and determines the moving velocity of the obstacle based on the target moving distance, so that the determination of the moving velocity of the obstacle is realized.

Some embodiments of the present disclosure provide an apparatus for determining the velocity of an obstacle. The apparatus includes:

a data acquisition module, configured to acquire a first point cloud data at a first time and a second point cloud data at a second time of the obstacle;

a point cloud registration module, configured to register the first point cloud data and the second point cloud data by moving the first point cloud data or the second point cloud data; and a velocity determination module, configured to determine a moving velocity of the obstacle based on a distance between two data points in a registered data point pair.

Alternatively, the point cloud registration module includes:

a distribution information determining unit, configured to determine first point cloud distribution information of the first point cloud data and second point cloud distribution information of the second point cloud data; and a point cloud registration unit, configured to register the first point cloud data and the second point cloud data, based on the first point cloud distribution information and the second point cloud distribution information.

Alternatively, the distribution information determining unit is further configured to:

determine a first projection plane of the first point cloud data;

project the first point cloud data into grids of a set size in the first projection plane, to obtain first grid projection data; and determine the first point cloud distribution information based on the first grid projection data.

Alternatively, the determining a first projection plane of the first point cloud data, includes:

determining at least one projection direction according to at least one direction of the moving velocity;

combining a direction perpendicular to a ground with the at least one projection direction, respectively; and constructing at least one first projection plane based on a direction pair obtained by the combining.

Alternatively, the projecting the first point cloud data into the grids of the set size in the first projection plane to obtain the first grid projection data, includes:

converting the first point cloud data into a three-dimensional coordinate system, the three-dimensional coordinate system being with a centroid of the first point cloud data as an origin, and a plane constructed by two coordinate axes of the coordinate system being the first projection plane;

partitioning, with the origin of the coordinate system as a center, the first projection plane into the grids of the set size; and projecting the converted first point cloud data into the partitioned grids to obtain the first grid projection data.

Alternatively, the projecting the first point cloud data into the grids of the set size in the first projection plane to obtain the first grid projection data, incudes:

determining a display scale of the first point cloud data in the grids based on a size of the first point cloud data and the size of the grid; and projecting the first point cloud data into the grids to obtain the first grid projection data according to the display scale.

Alternatively, the determining the first point cloud distribution information based on the first grid projection data, includes:

in response to a number of data points projected into a grid being greater than 0, determining a distance parameter between the grid and an obstacle boundary as 0;

in response to the number of the data points projected into the grid is less than or equal to 0, searching, in a row direction, for a target grid closest to the grid and having a number of projected data points greater than 0;

determining the distance parameter of the grid based on a number of grids between the grid and the target grid; and using the determined distance parameter as the first point cloud distribution information.

Alternatively, the point cloud distribution information comprises at least one of: numbers of data points projected into the grids, distance parameters between the grids and the obstacle boundary, numbers of data points projected into columns of grids, or a length of grids in the row direction of the obstacle.

Alternatively, the point cloud registration module incudes:

a point cloud movement unit, configured to move the first point cloud data or the second point cloud data based on an orientation of the obstacle;

a matching degree calculation unit, configured to calculate a matching degree between the first point cloud data and the second point cloud data after moving, based on the first point cloud distribution information and the second point cloud distribution information; and a registration position determining unit, configured to determine a registration position of the first point cloud data and the second point cloud data based on the calculated matching degree.

Alternatively, the registration position determination unit is specifically configured to:

normalize matching degrees calculated after at least two times of moving, to obtain probabilities that the at least two times of moving belong to real displacements;

calculate a displacement expectation based on the probabilities, and using the calculated displacement expectation as an optimal moving distance; and use a position after moving the optimal moving distance as the registration position.

Alternatively, the velocity determination module incudes:

a distance determining unit, configured to determine a target moving distance of the obstacle between the first time and the second time, based on the distance between the two data points in the registered data point pair; and a velocity determining unit, configured to determine the moving velocity of the obstacle, based on the target moving distance.

Some embodiments of the present disclosure provide an electronic device, the electronic device includes:

at least one processor; and a memory, communicatively connected to the at least one processor, the memory storing instructions executable by the at least one processor, the instructions, when executed by the at least one processor, cause the at least one processor to perform the method according to any one of embodiments of the present disclosure.

Some embodiments of the present disclosure provide a non-transitory computer readable storage medium, storing computer instructions, the computer instructions, being used to cause a computer to perform the method according to any one of embodiments of the present disclosure.

BRIEF DESCRIPTION OF THE DRAWINGS

The accompanying drawings are used to better understand the present solution, and do not constitute a limitation on the present disclosure, in which.

DETAILED DESCRIPTION OF EMBODIMENTS

The following describes example embodiments of the present disclosure in conjunction with the accompanying drawings, which includes various details of the embodiments of the present disclosure to facilitate understanding, and they should be considered as merely example. Therefore, those of ordinary skill in the art should recognize that various changes and modifications may be made to the embodiments described herein without departing from the scope and spirit of the present disclosure. Also, for clarity and conciseness, descriptions of well-known functions and structures are omitted in the following description.

In the current unmanned driving system, when performing obstacle tracking, the observed velocity of an obstacle is usually calculated based on changes in the centroid position of the obstacle. However, due to blocking and other reasons, the centroid position calculated using point cloud coordinates fluctuates greatly, and the error of observed velocity calculated using this method is large.

First Embodiment

Figure 1:
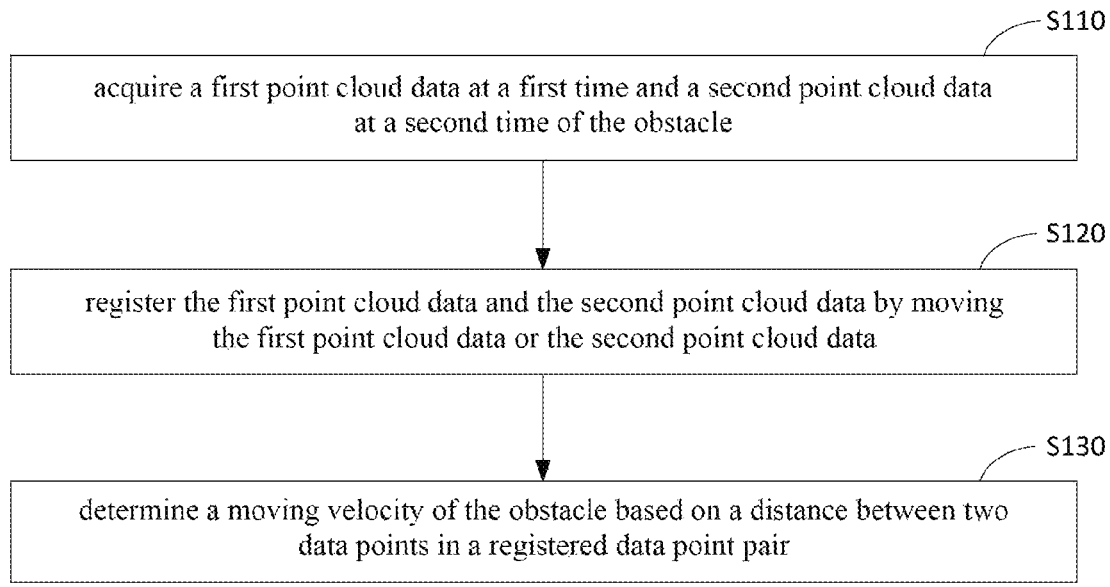
FIG. 1 is a flowchart of a method for determining a velocity of an obstacle according to a first embodiment of the present disclosure.

FIG. 1 is a flowchart of a method for determining a velocity of an obstacle according to a first embodiment of the present disclosure. The present embodiment is applicable to the case where the moving velocity of an obstacle is determined based on point cloud data of the obstacle at two time points. Typically, the present embodiment may be applied to the case where an autonomous driving vehicle determines the moving velocity of the obstacle based on collected point cloud data of the obstacle at two times, and performs the control of the autonomous driving vehicle based on the moving velocity of the obstacle.

The method may be implemented by an apparatus for determining a velocity of an obstacle, and the apparatus may be implemented by software and/or hardware. Referring to FIG. 1, the method for determining a velocity of an obstacle provided by an embodiment of the present disclosure includes:

S110, acquiring a first point cloud data of the obstacle at a first time and a second point cloud data of the obstacle at a second time.

Specifically, the obstacle may be any object that blocks the autonomous driving vehicle from traveling. Typically, the obstacle is a traveling vehicle in front of the autonomous driving vehicle.

The point cloud data of the obstacle may be acquired using a sensor configured on the autonomous driving vehicle.

S120, registering the first point cloud data and the second point cloud data by moving the first point cloud data or the second point cloud data.

Specifically, the registering the first point cloud data and the second point cloud data by moving the first point cloud data or the second point cloud data, includes:

moving the first point cloud data or the second point cloud data;

calculating a matching degree between the first point cloud data and the second point cloud data after moving, based on positional relationships between data points in the first point cloud data and data points in the second point cloud data; and determining a registration position of the first point cloud data and the second point cloud data based on the calculated matching degree.

S130, determining a moving velocity of the obstacle based on a distance between two data points in a registered data point pair.

Here, the registered data point pair refers to a pair of data points that overlaps after registration. One data point in the pair of data points belongs to the first point cloud data, and the other data point belongs to the second point cloud data.

Specifically, determining a moving velocity of the obstacle based on a distance between two data points in a registered data point pair, includes:

determining a target moving distance of the obstacle between the first time and the second time, based on the distance between the two data points in the registered data point pair; and determining the moving velocity of the obstacle, based on the target moving distance.

Specifically, determining the moving velocity of the obstacle, based on the target moving distance, includes:

determining a time difference between the first time and the second time; and acquiring the moving velocity of the obstacle based on the target moving distance and the time difference.

In the embodiment of the present disclosure, by adding a process of registering the first point cloud data and the second point cloud data by moving the first point cloud data or the second point cloud data, so that even if the point cloud data is incomplete, it is still possible to find an accurately registered data point pair, thereby effectively solving the blocking problem and improving the accuracy of the velocity of the obstacle.

In order to reduce calculation amount and improve the registration efficiency, the registering the first point cloud data and the second point cloud data by moving the first point cloud data or the second point cloud data, includes:

moving the first point cloud data or the second point cloud data based on the orientation of the obstacle;

calculating a matching degree between the first point cloud data and the second point cloud data after moving, based on the first point cloud distribution information and the second point cloud distribution information; and determining the registration position of the first point cloud data and the second point cloud data based on the calculated matching degree.

Here, the first point cloud distribution information refers to point cloud distribution information of the first point cloud data.

The second point cloud distribution information refers to point cloud distribution information of the second point cloud data.

Point cloud distribution information is information representing location distribution of the data points in point cloud data.

Specifically, the point cloud distribution information includes at least one of: local distribution density of the data points, a distance between the a point and the obstacle boundary, longitudinal distribution density of the data points, or a lateral length of the obstacle.

Specifically, determining the local distribution density of the data points, includes:

partitioning the data points in the point cloud data by grids, and counting the numbers of data points falling within the grids; and determining the local distribution density of the data points based on the numbers of data points falling within the grids.

determining the distance between a data point and an obstacle boundary, includes:

determining the obstacle boundary based on the point cloud data; and determining the distance between an data point in the point cloud data and the obstacle boundary, based on the obstacle boundary.

determining the longitudinal distribution density of the data points, includes:

partitioning the data points in the point cloud data by columns, and counting the numbers of data points in the columns; and determining the longitudinal distribution density of the data points, based on the counted numbers of data points in the columns.

determining the lateral length of the obstacle, includes:

partitioning projected data points by rows, and counting the numbers of data points in the rows; and using the maximum value of counted numbers as the lateral length of the obstacle.

Specifically, the determining the registration position of the first point cloud data and the second point cloud data based on the calculated matching degree, includes:

normalizing matching degrees calculated after at least two times of moving, to obtain probabilities that the at least two times of moving belong to real displacements;

calculating a displacement expectation based on the probabilities, and using the calculated displacement expectation as the optimal moving distance; and using a position after moving the optimal moving distance as the registration position.

Based on this technical feature, the embodiment of the present disclosure perform optimal estimation on the moving distance by using the matching degrees calculated after at least two times of moving, so as to improve an accuracy of determining the moving distance, and thus the accuracy of determining the registration position is improved.

Second Embodiment

Figure 2:
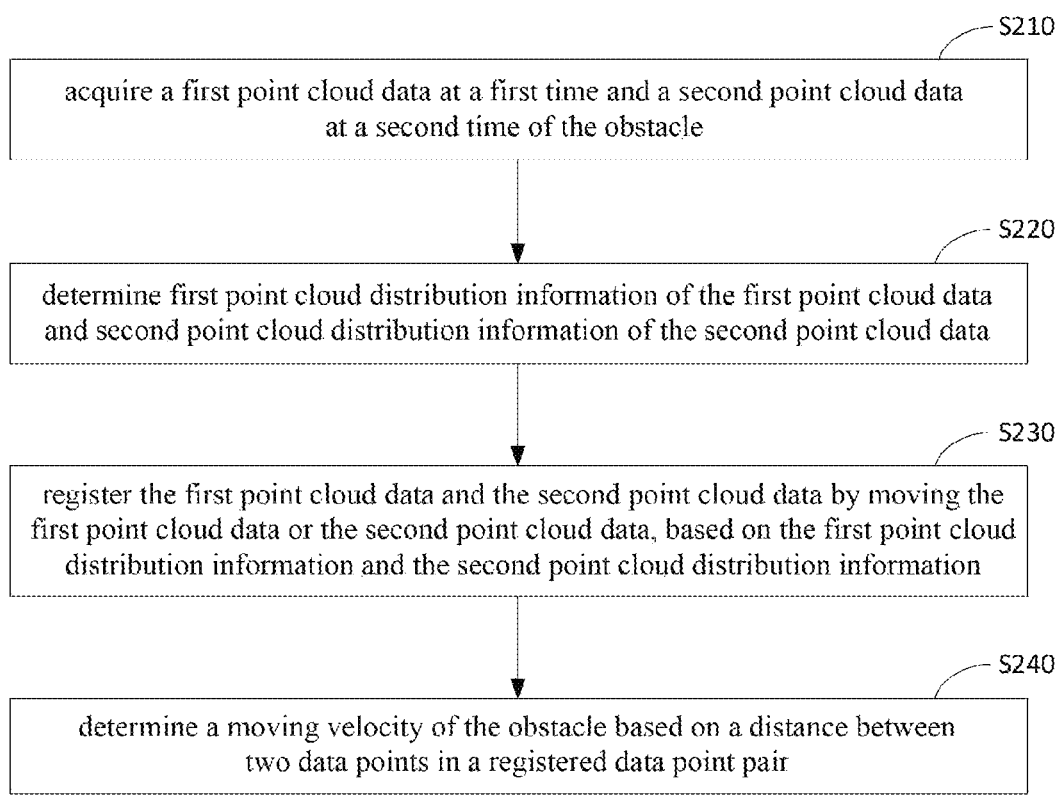
FIG. 2 is a flowchart of a method for determining a velocity of an obstacle according to a second embodiment of the present disclosure.

FIG. 2 is a flowchart of a method for determining a velocity of an obstacle according to a second embodiment of the present disclosure. The present embodiment is an alternative solution proposed on the basis of the foregoing embodiment. Referring to FIG. 2, the method for determining a velocity of an obstacle provided by an embodiment of the present disclosure includes:

S210, acquiring a first point cloud data of the obstacle at a first time and a second point cloud data of the obstacle at a second time.

S220, determining first point cloud distribution information of the first point cloud data and second point cloud distribution information of the second point cloud data.

Specifically, the determining first point cloud distribution information of the first point cloud data, includes:

determining the smallest circumscribed polygon of the first point cloud data, and using the determined smallest circumscribed polygon as the first point cloud distribution information of the first point cloud data.

S230, registering the first point cloud data and the second point cloud data by moving the first point cloud data or the second point cloud data, based on the first point cloud distribution information and the second point cloud distribution information.

S240, determining a moving velocity of the obstacle based on a distance between two data points in a registered data point pair.

In the embodiment of the present disclosure, by registering the first point cloud data and the second point cloud data based on the first point cloud distribution information and the second point cloud distribution information, compared to registering directly based on the data points, since the embodiment of the present disclosure does not need to perform registration calculation on each of the data points, the amount of calculation may be reduced, thereby further improving the registration efficiency.

Third Embodiment

Figure 3:
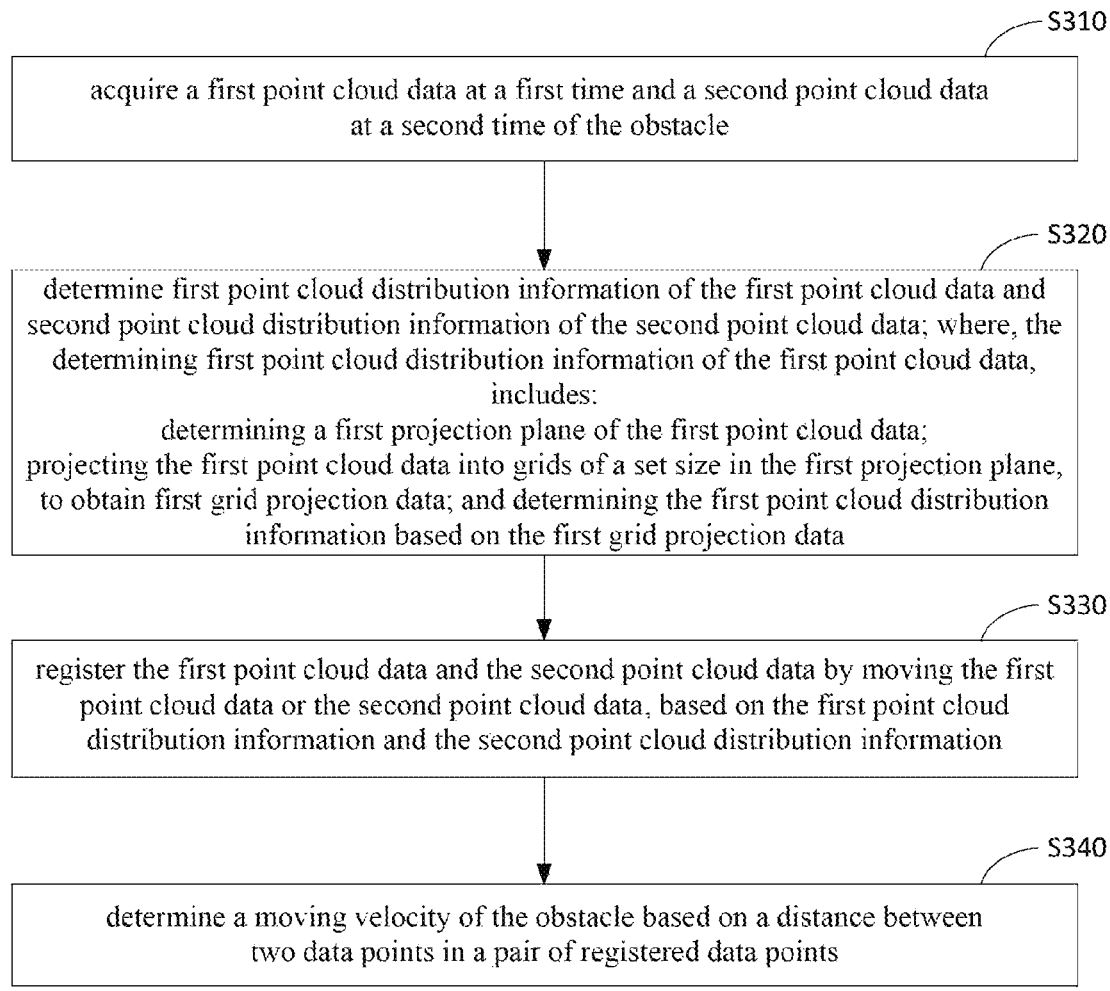
FIG. 3 is a flowchart of a method for determining a velocity of an obstacle according to a third embodiment of the present disclosure.

FIG. 3 is a flowchart of a method for determining a velocity of an obstacle according to a third embodiment of the present disclosure. The present embodiment is an alternative solution proposed on the basis of the foregoing embodiments. Referring to FIG. 3, the method for determining a velocity of an obstacle provided by an embodiment of the present disclosure includes:

S310, acquiring a first point cloud data of the obstacle at a first time and a second point cloud data of the obstacle at a second time.

S320, determining first point cloud distribution information of the first point cloud data and second point cloud distribution information of the second point cloud data.

Here, the determining first point cloud distribution information of the first point cloud data, comprises:

determining a first projection plane of the first point cloud data;

projecting the first point cloud data into grids of a set size in the first projection plane, to obtain first grid projection data; and determining the first point cloud distribution information based on the first grid projection data.

Here, the first projection plane refers to a plane that the first point cloud data are projected thereon.

Specifically, the determining a first projection plane of the first point cloud data, includes:

determining at least one projection direction according to at least one direction of the moving velocity;

combining a direction perpendicular to the ground with the at least one projection direction, respectively; and constructing at least one first projection plane based on a direction pair obtained by the combining.

Here, because the velocity is a vector representing the velocity and direction of movement of a moving point at a certain instantaneous time point, so that the moving velocity has a direction.

Specifically, the at least one direction of the moving velocity may be preset.

The direction pair includes a direction perpendicular to the ground and a projection direction.

Specifically, the at least one projection direction includes: the orientation of the obstacle and the vertical direction of the obstacle, and the vertical direction of the obstacle is a direction perpendicular to the orientation of the obstacle in the horizontal plane.

The present embodiment uses only the first point cloud distribution information as an example to describe the determination solution of the point cloud distribution information. Alternatively, the above determination logic is also applicable to the determination of the second point cloud distribution information.

S330, registering the first point cloud data and the second point cloud data by moving the first point cloud data or the second point cloud data, based on the first point cloud distribution information and the second point cloud distribution information.

S340, determining a moving velocity of the obstacle based on a distance between two data points in a registered data point pair.

In the embodiment of the present disclosure, by projecting the first point cloud data into grids of a set size in the first projection plane, and determining the first point cloud distribution information based on the projection data of the grids, thereby facilitating the determination of the point cloud distribution information, and improving the accuracy of describing the first point cloud data by the first point cloud distribution information.

Further, the projecting the first point cloud data into grids of a set size in the first projection plane to obtain first grid projection data, includes:

converting the first point cloud data into a three-dimensional coordinate system that is with the centroid of the first point cloud data as the origin, and a plane constructed by two coordinate axes of the coordinate system being the first projection plane;

partitioning, with the origin of the coordinate system as the center, the first projection plane into the grids of the set size; and projecting the converted first point cloud data into the partitioned grids to obtain the first grid projection data.

Based on this technical feature, the embodiment of the present disclosure converts the first point cloud data into a three-dimensional coordinate system that is with the centroid of the first point cloud data as the origin; partitions, with the origin of the coordinate system as the center, the first projection plane into the grids of the set size; and projects the converted first point cloud data into the partitioned grids, so that the projection points of the first point cloud data are distributed with the center of the grids as a distribution center, thereby facilitating subsequent registration calculation.

Further, the determining the first point cloud distribution information based on the first grid projection data, includes:

if the number of data points projected into a grid is greater than 0, determining a distance parameter between the grid and an obstacle boundary as 0;

if the number of data points projected into a grid is less than or equal to 0, searching, in a row direction, for a target grid closest to the grid and having the number of projected data points greater than 0;

determining the distance parameter of the grid based on the number of grids between the grid and the target grid; and using the determined distance parameter as the first point cloud distribution information.

Based on this technical feature, the embodiment of the present disclosure determines the distance parameter between a grid and the obstacle boundary, based on the number of data points projected into the grid, thereby realizing the determination of the first point cloud distribution information.

In order to project all the data points in the first point cloud data into the grids to obtain complete point cloud distribution information, the projecting the first point cloud data into the grids of a set size in the first projection plane to obtain first grid projection data, includes:

determining a display scale of the first point cloud data in a grid based on the size of the first point cloud data and the size of the grid; and projecting the first point cloud data into the grids to obtain the first grid projection data according to the display scale.

Alternatively, the point cloud distribution information includes at least one of: the number of data points projected into the grids, the distance parameters between the grids and the obstacle boundary, the numbers of data points projected into columns of grids, or a length of the grids in the row direction of the obstacle.

Specifically, the numbers of data points projected into the grids may also be understood as the numbers of data points associated with the grids.

The distance parameters between the grids and the obstacle boundary may also be understood as the distance between each of the grids and the obstacle boundary closest to the grid.

The numbers of data points projected into columns of grids may also be understood as the number of associated data points in each column of the grids.

The length of the grids in the row direction of the obstacle may also be understood as the number of grids in the row of grids of longest length in the rows of grids to which the obstacle belongs.

Based on this technical feature, the embodiment of the present disclosure registers the point cloud based on at least one of the numbers of data points projected into the grids, the distance parameters between the grids and the obstacle boundary, the numbers of data points projected into columns of grids, or the length of the grids in the row direction of the obstacle, thereby improving the registration accuracy of point cloud data.

Fourth Embodiment

Figure 4:
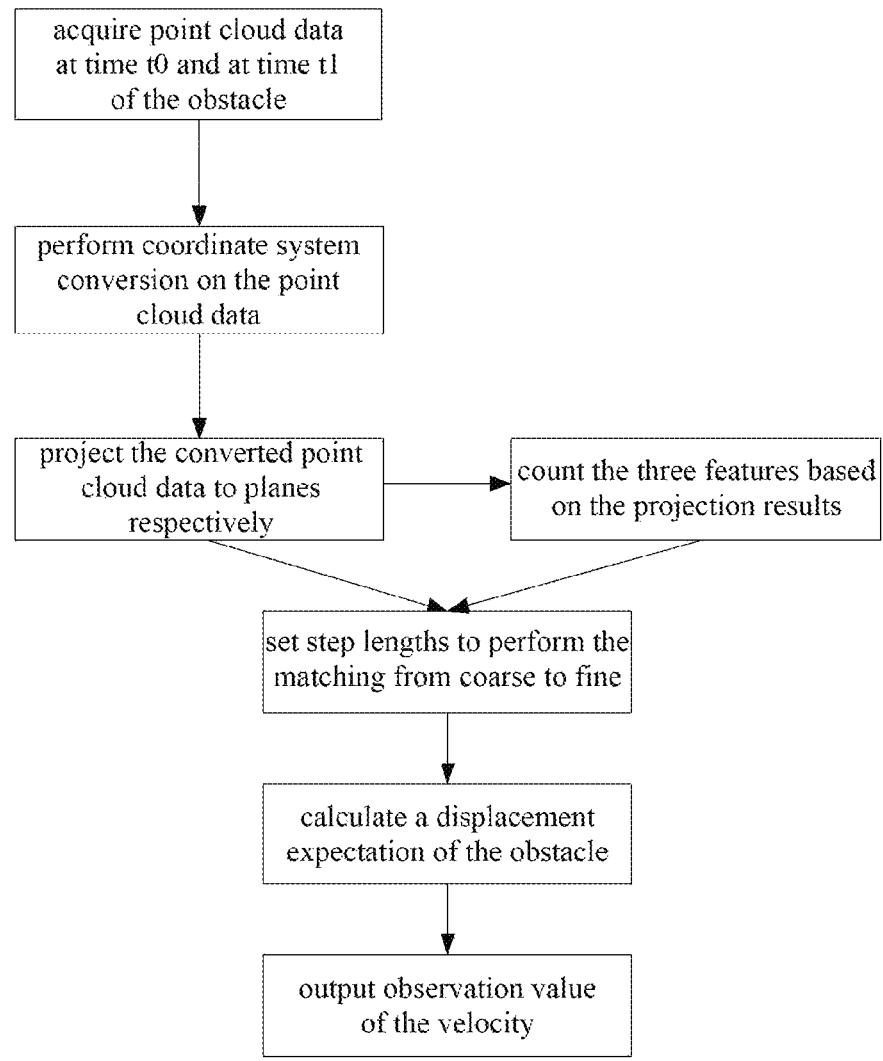
FIG. 4 is a flowchart of a method for determining a velocity of an obstacle according to a fourth embodiment of the present disclosure.

FIG. 4 is a flowchart of a method for determining a velocity of an obstacle according to a fourth embodiment of the present disclosure. The present embodiment is an alternative solution proposed on the basis of the foregoing embodiments. Referring to FIG. 4, the method for determining a velocity of an obstacle provided by an embodiment of the present disclosure includes:

(1) Acquiring the first point cloud data at time $t0$ and the second point cloud data at time $t1$ of the obstacle, the coordinate system of the point cloud data belonging to the world coordinate system; and determining the centroid of the first point cloud data and recording as $c0$, and determining the centroid of the second point cloud data and recording as $c1$.

(2) Converting the first point cloud data into the first coordinate system that is with $c0$ as the origin, and converting the second point cloud data into the second coordinate system that is with $c1$ as the origin, where the directions of the first coordinate axes of the two coordinate systems are the orientations of the obstacle at the times, the directions of the second coordinate axes are the vertical direction of the obstacle, and the directions of the third coordinate axes are the direction perpendicular to the ground.

(3) Partitioning a first plane and a second plane of the first coordinate system, and a third plane and a fourth plane of the second coordinate system into grids with a set size, the first plane being a plane constructed by the first coordinate axis and the third coordinate axis of the first coordinate system, the second plane being a plane constructed by the second coordinate axis and the third coordinate axis of the first coordinate system, the third plane being a plane constructed by the first coordinate axis and the third coordinate axis of the second coordinate system, and the fourth plane being a plane constructed by the second coordinate axis and the third coordinate axis of the second coordinate system; determining a display scale of the point cloud data in the grids based on the size of the point cloud data and the size of the grid; and projecting the first point cloud data into the grids of the first plane and the second plane respectively, projecting the second point cloud data into the grids of the third plane and the fourth plane respectively, according to the display scale, and calculating three features in each plane as follows:

A. counting the number of data points associated with each grid, and determining the distance parameter of each grid, the determination logic of the distance parameter includes: if the number of data points associated with a grid is greater than 0, the parameter value is 0; otherwise, searching, respectively along the positive and negative directions of the first coordinate axis, for a target grid closest to the current grid and having the number of associated data points greater than 0; and using the square of the number of grids between the current grid and the target grid as the distance parameter value of the current grid;

B. counting the numbers of data points associated with the columns of grids; and C. the length of the grids of the obstacle in the row direction.

(4) Moving the grids in the first plane and the grids in the third plane at a first step length; matching the grids of the first plane with the grids of the third plane, and matching the grids of the second plane with the grids of the fourth plane after the moving, based on the above three features; determining a candidate matching range based on the matching degrees; and performing fine-grained displacement and matching within the candidate matching range based on a second step length, the second step length being less than the first step length;

based on the above three features, the matching degree when the moving distance is s is calculated as follows:

Prob[s]=exp(log_prob[s]−min_log_prob)+0.5, where prob[s] is the matching degree, log_probs[s]=log(score_a)+log(score_b)+log(score_c), min_log_prob=min(log_probs[0],log_probs[1], . . . , log_probs[n]);

where n represents the moving distance, score_a is the similarity score of feature A, specifically, score_a=exp(−cost*scale)*epsilon, where, cost=average(sqrt(source.count)*target.dist)), source.count refers to the number of data points associated with a grid at time t0 which overlaps a grid at time t1, target.dist refers to the distance parameter value of the grid at time t1 which overlaps a grid at time t0, scale and epsilon are parameters;

score_b is the similarity score of feature B, specifically score_b=exp(−cost*8)+epsilon, here, cost=sum(fabs(source.point_density−target.point_density)), source.point_density refers to the number of data points in a column of grids at time t0 which overlaps a column of grids at time t1; and target.point_density refers to the number of data points in a column of grids at time t1 which overlaps a column of grids at time t0;

score_c is the similarity score of feature C, specifically, if the length of the intersection of the grids at time t0 and the grids at time t1 in the row direction is greater than 0, then score_c=exp(−distance*0.3)+epsilon, otherwise, score=epsilon, here, distance=min(source.l, target.l)−intersection;

source.l is the length of the grids at time t0, which overlaps column girds at time t1, of the obstacle in the row direction, and target.l is the length of the grids at time t1, which overlaps the column girds at time t1, of the obstacle in the row direction.

(5) Based on the matching degree obtained by the matching at fine-grain, calculating a probability that each fine-grained displacement belongs to a real displacement; calculating a displacement expectation based on the probabilities, and using the calculated displacement expectation as the number of grids for an optimal estimated displacement.

(6) Determining a relative moving velocity of the obstacle in a first direction, based on the number of grids for the optimal estimated displacement and a display scale of each grid pair calculated on the basis of the first plane and the third plane; determining a relative moving velocity of the obstacle in a second direction based on the number of grids for the optimal estimated displacement and a display scale of each grid pair calculated on the basis of the second plane and the fourth plane; and converting the determined relative moving velocities into the world coordinate system, to obtain an actual moving velocity of the obstacle, and using the obtained actual moving velocity as a velocity observation value of the obstacle.

Embodiments of the present disclosure may achieve the following technical effects:

The point cloud is projected onto two two-dimensional planes for matching, and a coarse to fine search method is used. This technology greatly improves the matching efficiency under the premise of ensuring correctness.

Point cloud information projected onto the two-dimensional planes is used to calculate three features, and these three features are used for matching. This technology can better improve the accuracy of matching.

The centroid and orientation information are used during converting the point cloud into a local coordinate system for projection, to facilitate calculation.

The matching degree is used to calculate the probability that each displacement is a real displacement, to find the displacement expectation and variance, thereby improving the accuracy of displacement determination.

Fifth Embodiment

Figure 5:
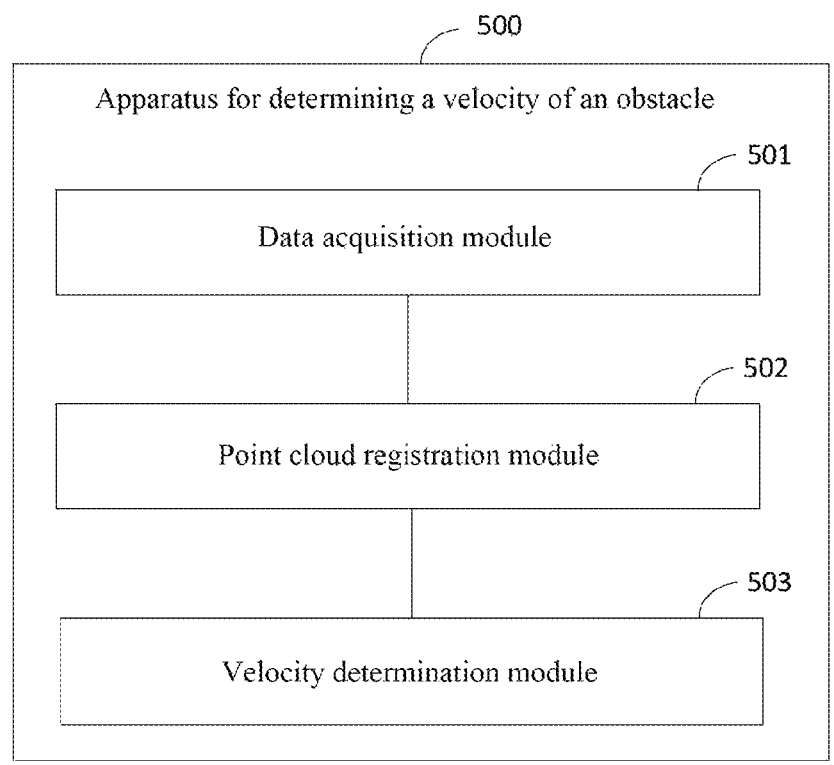
FIG. 5 is a schematic structural diagram of an apparatus for determining a velocity of an obstacle according to a fifth embodiment of the present disclosure.

FIG. 5 is a schematic structural diagram of an apparatus for determining a velocity of an obstacle according to a fifth embodiment of the present disclosure. Referring to FIG. 5, the apparatus 500 for determining a velocity of an obstacle provided in the present embodiment includes: a data acquisition module 501, a point cloud registration module 502, and a velocity determination module 503.

The data acquisition module 501 is configured to acquire a first point cloud data at a first time and a second point cloud data at a second time of the obstacle;

the point cloud registration module 502 is configured to register the first point cloud data and the second point cloud data by moving the first point cloud data or the second point cloud data; and the velocity determination module 503 is configured to determine a moving velocity of the obstacle based on a distance between two data points in a registered data point pair.

In the embodiment of the present disclosure, by adding a process of registering the first point cloud data and the second point cloud data by moving the first point cloud data or the second point cloud data, so that even if the point cloud data is incomplete, it is still possible to find a pair of data points accurately registered, thereby effectively solving the blocking problem and improving the accuracy of the velocity of the obstacle.

Further, the point cloud registration module includes:

a distribution information determining unit, configured to determine first point cloud distribution information of the first point cloud data and second point cloud distribution information of the second point cloud data; and a point cloud registration unit, configured to register the first point cloud data and the second point cloud data, based on the first point cloud distribution information and the second point cloud distribution information.

Further, the distribution information determining unit is further configured to:

determine a first projection plane of the first point cloud data;

project the first point cloud data into grids of a set size in the first projection plane, to obtain first grid projection data; and determine the first point cloud distribution information based on the first grid projection data.

Further, the determining a first projection plane of the first point cloud data, includes:

determining at least one projection direction according to at least one direction of the moving velocity;

combining a direction perpendicular to a ground with the at least one projection direction, respectively; and constructing at least one first projection plane based on a direction pair obtained by the combining.

Further, the projecting the first point cloud data into the grids of the set size in the first projection plane to obtain the first grid projection data, includes:

converting the first point cloud data into a three-dimensional coordinate system, the three-dimensional coordinate system being with a centroid of the first point cloud data as an origin, and a plane constructed by two coordinate axes of the coordinate system being the first projection plane;

partitioning, with the origin of the coordinate system as a center, the first projection plane into the grids of the set size; and projecting the converted first point cloud data into the partitioned grids to obtain the first grid projection data.

Further, the projecting the first point cloud data into the grids of the set size in the first projection plane to obtain the first grid projection data, includes:

determining a display scale of the first point cloud data in the grids based on a size of the first point cloud data and the size of the grid; and projecting the first point cloud data into the grids to obtain the first grid projection data according to the display scale.

Further, the determining the first point cloud distribution information based on the first grid projection data, includes:

if a number of data points projected into a grid is greater than 0, determining a distance parameter between the grid and an obstacle boundary as 0;

if the number of the data points projected into the grid is less than or equal to 0, searching, in a row direction, for a target grid closest to the grid and having a number of projected data points greater than 0;

determining the distance parameter of the grid based on a number of grids between the grid and the target grid; and using the determined distance parameter as the first point cloud distribution information.

Further, the point cloud distribution information includes at least one of: numbers of data points projected into the grids, distance parameters between the grids and the obstacle boundary, numbers of data points projected into columns of grids, or a length of grids in the row direction of the obstacle.

Further, the point cloud registration module includes:

a point cloud movement unit, configured to move the first point cloud data or the second point cloud data based on an orientation of the obstacle;

a matching degree calculation unit, configured to calculate a matching degree between the first point cloud data and the second point cloud data after moving, based on the first point cloud distribution information and the second point cloud distribution information; and a registration position determining unit, configured to determine a registration position of the first point cloud data and the second point cloud data based on the calculated matching degree.

Further, the registration position determining unit is specifically configured to:

normalize matching degrees calculated after at least two times of moving, to obtain probabilities that the at least two times of moving belong to real displacements;

calculate a displacement expectation based on the probabilities, and using the calculated displacement expectation as an optimal moving distance; and use a position after moving the optimal moving distance as the registration position.

Further, the velocity determination module includes:

a distance determining unit, configured to determine a target moving distance of the obstacle between the first time and the second time, based on the distance between the two data points in the registered data point pair; and a velocity determining unit, configured to determine the moving velocity of the obstacle, based on the target moving distance.

Sixth Embodiment

According to an embodiment of the present disclosure, an electronic device and a readable storage medium are provided.

Figure 6:
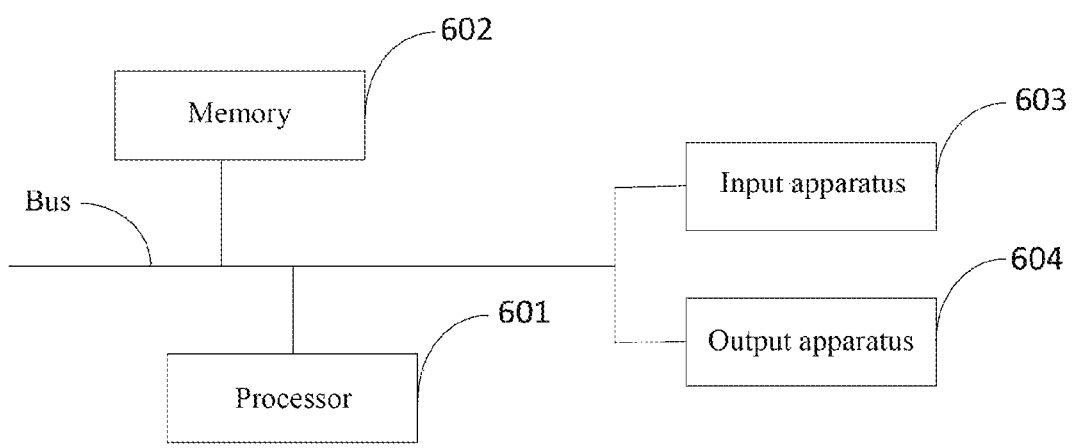
FIG. 6 is a block diagram of an electronic device for implementing the method for determining a velocity of an obstacle according to the embodiments of the present disclosure.

As shown in FIG. 6, a block diagram of an electronic device of a method for determining a velocity of an obstacle according to an embodiment of the present disclosure is illustrated. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-velocity interfaces and low-velocity interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 6, one processor 601 is used as an example.

The memory 602 is a non-transitory computer readable storage medium provided by an embodiment of the present disclosure. The memory stores instructions executable by at least one processor, so that the at least one processor performs the method for determining a velocity of an obstacle provided by embodiments of the present disclosure. The non-transitory computer readable storage medium of the present disclosure stores computer instructions for causing a computer to perform the method for determining a velocity of an obstacle provided by the present disclosure.

The memory 602, as a non-transitory computer readable storage medium, may be used to store non-transitory software programs, non-transitory computer executable programs and modules, such as program instructions/modules corresponding to the method for determining a velocity of an obstacle in the embodiments of the present disclosure (for example, the data acquisition module 501, the point cloud registration module 502, and the velocity determination module 503 shown in FIG. 5). The processor 601 executes the non-transitory software programs, instructions, and modules stored in the memory 602 to execute various function applications and data processing of the server, that is, to implement the method for determining a velocity of an obstacle in the foregoing method embodiments.

The memory 602 may include a storage program area and a storage data area, where the storage program area may store an operating system and at least one function required application program; and the storage data area may store data created by the use of the electronic device according to the method for determining a velocity of an obstacle, etc. In addition, the memory 602 may include a high-velocity random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device of the method for determining a velocity of an obstacle through a network. Examples of the above network include but are not limited to the Internet, intranet, blockchain network, local area network, mobile communication network, and combinations thereof.

The electronic device of the method for determining a velocity of an obstacle may further include: an input apparatus 603 and an output apparatus 604. The processor 601, the memory 602, the input apparatus 603, and the output apparatus 604 may be connected through a bus or in other methods. In FIG. 6, connection through a bus is used as an example.

The input apparatus 603 may receive input digital or character information, and generate key signal inputs related to user settings and function control of the electronic device of the method for determining a velocity of an obstacle, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, and the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area network (LAN), wide area network (WAN), the Internet, and blockchain network.

The computer system may include a client and a server. The client and the server are generally far from each other and usually interact through the communication network. The relationship between the client and the server is generated by computer programs that run on the corresponding computer and have a client-server relationship with each other.

It should be understood that the various forms of processes shown above may be used to reorder, add, or delete steps. For example, the steps described in embodiments of the present disclosure may be performed in parallel, sequentially, or in different orders, as long as the desired results of the technical solution disclosed in embodiments of the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement, etc. made within the spirit and principle of the present disclosure shall be included in the protection scope of the present disclosure.

What is claimed is:

1. A computer-implemented method for determining a velocity of an obstacle, the method comprising:
acquiring, by a sensor configured in a vehicle, a first point cloud data of the obstacle at a first time and a second point cloud data of the obstacle at a second time;
determining first point cloud distribution information of the first point cloud data and second point cloud distribution information of the second point cloud data, the determining comprising:
projecting the first point cloud data into grids of a set size in a first projection plane, to obtain first grid projection data;
in response to a number of data points projected into a grid being greater than 0, determining a distance parameter between the grid and an obstacle boundary as 0;
in response to the number of the data points projected into the grid is less than or equal to 0, searching, in a row direction, for a target grid closest to the grid and having a number of projected data points greater than 0;
determining the distance parameter of the grid based on a number of grids between the grid and the target grid; and
using the determined distance parameter as the first point cloud distribution information; and
registering the first point cloud data and the second point cloud data, based on the first point cloud distribution information and the second point cloud distribution information;
determining a moving velocity of the obstacle based on a distance between two data points in a registered data point pair; and
controlling autonomous driving of the vehicle based on the moving velocity of the obstacle.

2. The method according to claim 1, wherein the determining first point cloud distribution information of the first point cloud data further comprises:
determining the first projection plane of the first point cloud data.

3. The method according to claim 2, wherein the determining a first projection plane of the first point cloud data, comprises:
determining at least one projection direction according to at least one direction of the moving velocity;
combining a direction perpendicular to a ground with the at least one projection direction, respectively; and
constructing at least one first projection plane based on a direction pair obtained by the combining.

4. The method according to claim 1, wherein the projecting the first point cloud data into the grids of the set size in the first projection plane to obtain the first grid projection data comprises:
converting the first point cloud data into a three-dimensional coordinate system, the three-dimensional coordinate system being with a centroid of the first point cloud data as an origin, and a plane constructed by two coordinate axes of the coordinate system being the first projection plane;
partitioning, with the origin of the coordinate system as a center, the first projection plane into the grids of the set size; and
projecting the converted first point cloud data into the partitioned grids to obtain the first grid projection data.

5. The method according to claim 1, wherein the projecting the first point cloud data into the grids of the set size in the first projection plane to obtain the first grid projection data comprises:
determining a display scale of the first point cloud data in the grids based on a size of the first point cloud data and the size of the grid; and
projecting the first point cloud data into the grids to obtain the first grid projection data according to the display scale.

6. The method according to claim 1, wherein the point cloud distribution information comprises at least one of: numbers of data points projected into the grids, distance parameters between the grids and an obstacle boundary, numbers of data points projected into columns of grids, or a length of grids in a row direction of the obstacle.

7. The method according to claim 1, wherein the determining a moving velocity of the obstacle based on the distance between two data points in the registered data point pair comprises:
determining a target moving distance of the obstacle between the first time and the second time, based on the distance between the two data points in the registered data point pair; and
determining the moving velocity of the obstacle, based on the target moving distance.

8. An apparatus for determining a velocity of an obstacle, the apparatus comprising:
at least one processor; and
a memory storing instructions, the instructions when executed by the at least one processor, causing the at least one processor to perform operations, the operations comprising:
acquiring, by a sensor configured in a vehicle, a first point cloud data of an obstacle at a first time and a second point cloud data of the obstacle at a second time;
determining first point cloud distribution information of the first point cloud data and second point cloud distribution information of the second point cloud data, the determining comprising:
projecting the first point cloud data into grids of a set size in a first projection plane, to obtain first grid projection data;
in response to a number of data points projected into a grid being greater than 0, determining a distance parameter between the grid and an obstacle boundary as 0;
in response to the number of the data points projected into the grid is less than or equal to 0, searching, in a row direction, for a target grid closest to the grid and having a number of projected data points greater than 0;
determining the distance parameter of the grid based on a number of grids between the grid and the target grid; and
using the determined distance parameter as the first point cloud distribution information; and
registering the first point cloud data and the second point cloud data, based on the first point cloud distribution information and the second point cloud distribution information;

determining a moving velocity of the obstacle based on a distance between two data points in a registered data point pair; and controlling autonomous driving of the vehicle based on the moving velocity of the obstacle.

9. The apparatus according to claim 8, wherein the determining first point cloud distribution information of the first point cloud data further comprises:

determining the first projection plane of the first point cloud data.

10. The apparatus according to claim 9, wherein the determining a first projection plane of the first point cloud data, comprises:

determining at least one projection direction according to at least one direction of the moving velocity;

combining a direction perpendicular to a ground with the at least one projection direction, respectively; and constructing at least one first projection plane based on a direction pair obtained by the combining.

11. The apparatus according to claim 8, wherein the projecting the first point cloud data into the grids of the set size in the first projection plane to obtain the first grid projection data comprises:

converting the first point cloud data into a three-dimensional coordinate system, the three-dimensional coordinate system being with a centroid of the first point cloud data as an origin, and a plane constructed by two coordinate axes of the coordinate system being the first projection plane;

partitioning, with the origin of the coordinate system as a center, the first projection plane into the grids of the set size; and projecting the converted first point cloud data into the partitioned grids to obtain the first grid projection data.

12. The apparatus according to claim 8, wherein the projecting the first point cloud data into the grids of the set size in the first projection plane to obtain the first grid projection data comprises:

determining a display scale of the first point cloud data in the grids based on a size of the first point cloud data and the size of the grid; and projecting the first point cloud data into the grids to obtain the first grid projection data according to the display scale.

13. The apparatus according to claim 8, wherein the point cloud distribution information comprises at least one of: numbers of data points projected into the grids, distance parameters between the grids and an obstacle boundary, numbers of data points projected into columns of grids, or a length of grids in a row direction of the obstacle.

14. The apparatus according to claim 8, wherein the registering the first point cloud data and the second point cloud data comprises:

moving the first point cloud data or the second point cloud data based on an orientation of the obstacle;

calculating a matching degree between the first point cloud data and the second point cloud data after moving, based on the first point cloud distribution information and the second point cloud distribution information; and determining a registration position of the first point cloud data and the second point cloud data based on the calculated matching degree.

15. The apparatus according to claim 14, wherein the determining the registration position of the first point cloud data and the second point cloud data based on the calculated matching degree comprises:

normalizing matching degrees calculated after at least two times of moving, to obtain probabilities that the at least two times of moving belong to real displacements;

calculating a displacement expectation based on the probabilities, and using the calculated displacement expectation as an optimal moving distance; and using a position after moving the optimal moving distance as the registration position.

16. A non-transitory computer readable storage medium, storing computer instructions thereon, the computer instructions, when executed by a processor, causing the processor to perform operations, the operations comprising:

acquiring, by a sensor configured in a vehicle, a first point cloud data of an obstacle at a first time and a second point cloud data of the obstacle at a second time;

determining first point cloud distribution information of the first point cloud data and second point cloud distribution information of the second point cloud data, the determining comprising:

projecting the first point cloud data into grids of a set size in a first projection plane, to obtain first grid projection data;

in response to a number of data points projected into a grid being greater than 0, determining a distance parameter between the grid and an obstacle boundary as 0;

in response to the number of the data points projected into the grid is less than or equal to 0, searching, in a row direction, for a target grid closest to the grid and having a number of projected data points greater than 0;

determining the distance parameter of the grid based on a number of grids between the grid and the target grid; and using the determined distance parameter as the first point cloud distribution information; and registering the first point cloud data and the second point cloud data, based on the first point cloud distribution information and the second point cloud distribution information;

determining a moving velocity of the obstacle based on a distance between two data points in a registered data point pair; and controlling autonomous driving of the vehicle based on the moving velocity of the obstacle.

\* \* \* \* \*